(12) United States Patent
Imhoff

(10) Patent No.: US 12,240,632 B2
(45) Date of Patent: Mar. 4, 2025

(54) AFFINE-INVARIANT SIMILARITY CONSTELLATION INTERCALIBRATION

(71) Applicant: Raytheon Company, Arlington, VA (US)

(72) Inventor: Scott A. Imhoff, Aurora, CO (US)

(73) Assignee: Raytheon Company, Arlington, VA (US)

( * ) Notice: Subject to any disclaimer, the term of this patent is extended or adjusted under 35 U.S.C. 154(b) by 278 days.

(21) Appl. No.: 17/838,647

(22) Filed: Jun. 13, 2022

(65) Prior Publication Data

US 2023/0399128 A1   Dec. 14, 2023

(51) Int. Cl.
*H04B 17/27* (2015.01)
*B64G 1/10* (2006.01)
*B64G 1/24* (2006.01)

(52) U.S. Cl.
CPC ........... *B64G 1/244* (2019.05); *B64G 1/1021* (2013.01); *B64G 1/1085* (2013.01); *H04B 17/27* (2015.01)

(58) Field of Classification Search
CPC .... B64G 1/244; B64G 1/1021; B64G 1/1085; H04B 117/27
See application file for complete search history.

(56) References Cited

U.S. PATENT DOCUMENTS

2008/0128559 A1* 6/2008 Ho .................. B64G 1/1021 244/164

2017/0118729 A1* 4/2017 Prunean ............... H04B 7/1858
2019/0245564 A1* 8/2019 Imhoff ............... H04B 17/3913
2020/0036437 A1* 1/2020 Heiman ............ H04B 7/18541

OTHER PUBLICATIONS

Alsweiss, et al., "Inter-calibration Results of the Advanced Microwave Scanning Radiometer-2 Over Ocean;" IEEE Journal of Selected Topics in Applied Earth Observations and Remote Sensing, vol. 8., No. 9, Sep. 2015.
Biswas, et al., "TRMM V7 Correction and Angle Issues;" Presentation material for GPM inter-calibration working group meeting; May 19, 2009.

\* cited by examiner

*Primary Examiner* — Yuwen Pan
*Assistant Examiner* — Daaniel Christian Paglia
(74) *Attorney, Agent, or Firm* — Schwegman Lundberg & Woessner, P.A.

(57) ABSTRACT

Systems and methods are provided for updating data in a computer network. An exemplary method includes: collecting a first set of measured information from a plurality of space vehicles and a second set of measured information from a reference space vehicle; deriving an affine system for each of the space vehicles; deriving a set of physical distance metrics between each of the space vehicles and the reference space vehicle; identifying a set of space vehicles having a physical distance metric below a threshold; upon identifying the set of space vehicles, performing a similarity analysis for each of the identified set of space vehicles producing a set of intercalibration parameters; applying the set of intercalibrations parameters to the affine system of each of the identified set of space vehicles; and forming an ensemble product defining calibrated sensor information from the space vehicles.

20 Claims, 4 Drawing Sheets

AFFINE-INVARIANT SIMILARITY CONSTELLATION INTERCALIBRATION

BACKGROUND

Satellite constellations containing active and passive sensors collect sensor measurements that provide the inputs to systems that determine or predict the weather or otherwise determine or predict the state of the planet, its environment, or human behaviors.

These sensors typically experience differences with respect to each other, including differences in gain A and/or offset B. These differences are miscalibration (or lack of calibration) which worsen the performance of the systems that use these measurements as inputs.

There is a need to provide intercalibration for satellite constellations so that the sensors on the satellites achieve both self-consistency and mutual consistency in the measurements for which those sensors are utilized.

SUMMARY

According to one aspect of the subject matter described in this disclosure, a system for intercalibration between remote sensing systems is provided. The system includes one or more computing device processors. Also, the system includes one or more computing device memories, coupled to the one or more computing device processors. The one or more computing device memories store instructions executed by the one or more computing device processors. The instructions are configured to: collect a first set of measured information from a plurality of space vehicles and a second set of measured information from a reference space vehicle; derive, using the first set of measured information, an affine system for each of the space vehicles; derive, using the first set of measured information and the second set of measured information, a set of physical distance metrics between each of the space vehicles and the reference space vehicle; identify, using the set of physical distance metrics, a set of space vehicles having a physical distance metric below a threshold; upon identifying the set of space vehicles, perform a similarity analysis for each of the identified set of space vehicles producing a set of intercalibration parameters for each of the identified set of space vehicles; apply the set of intercalibrations parameters to the affine system of each of the identified set of space vehicles producing a set of affine information; and form, using the set of affine information, an ensemble product defining calibrated sensor information from the space vehicles.

According to another aspect of the subject matter described in this disclosure, a method for intercalibration between remote sensing systems is provided. The method includes the following: collecting a first set of measured information from a plurality of space vehicles and a second set of measured information from a reference space vehicle; deriving, using the first set of measured information, an affine system for each of the space vehicles; deriving, using the first set of measured information and the second set of measured information, a set of physical distance metrics between each of the space vehicles and the reference space vehicle; identifying, using the set of physical distance metrics, a set of space vehicles having a physical distance metric below a threshold; upon identifying the set of space vehicles, performing a similarity analysis for each of the identified set of space vehicles producing a set of intercalibration parameters for each of the identified set of space vehicles; applying the set of intercalibrations parameters to the affine system of each of the identified set of space vehicles producing a set of affine information; and forming, using the set of affine information, an ensemble product defining calibrated sensor information from the space vehicles.

According to another aspect of the subject matter described in this disclosure, a non-transitory computer-readable storage medium storing instructions which when executed by a computer cause the computer to perform a method for intercalibration between remote sensing systems is provided. The method includes the following: collecting a first set of measured information from a plurality of space vehicles and a second set of measured information from a reference space vehicle; deriving, using the first set of measured information, an affine system for each of the space vehicles; deriving, using the first set of measured information and the second set of measured information, a set of physical distance metrics between each of the space vehicles and the reference space vehicle; identifying, using the set of physical distance metrics, a set of space vehicles having a physical distance metric below a threshold; upon identifying the set of space vehicles, performing a similarity analysis for each of the identified set of space vehicles producing a set of intercalibration parameters for each of the identified set of space vehicles; applying the set of intercalibrations parameters to the affine system of each of the identified set of space vehicles producing a set of affine information; and forming, using the set of affine information, an ensemble product defining calibrated sensor information from the space vehicles.

Additional features and advantages of the present disclosure is described in, and will be apparent from, the detailed description.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes a system and method for performing intercalibration of space vehicles. The system and method for performing intercalibration of space vehicles are configured to utilize coincident or nearly coincident sensor collections to intercalibrate a constellation of space vehicles and produce metrics of intercalibration and optimized ensemble sensor measurements.

Figure 1:
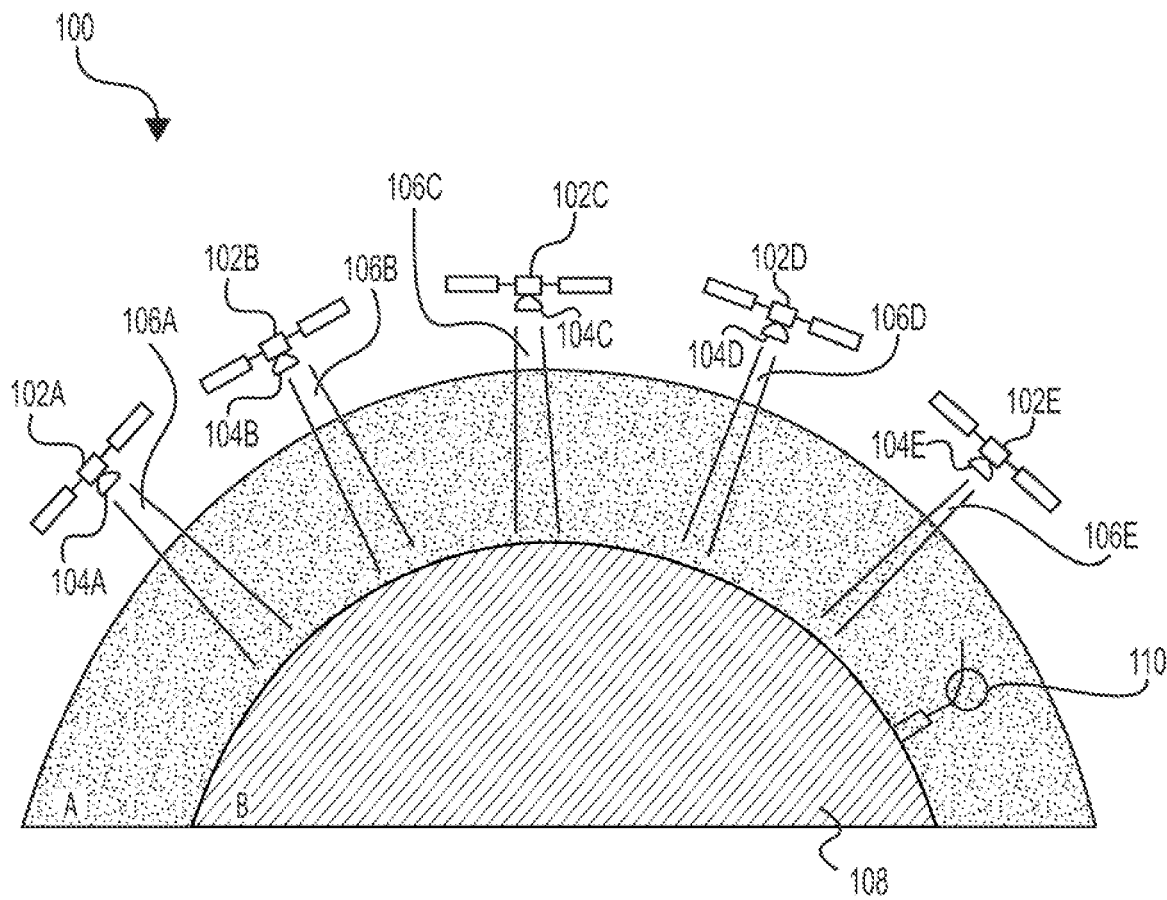
FIG. 1 is a schematic diagram of a constellation 100 of space vehicles 102A-102E, in accordance with some embodiments.

FIG. 1 is a schematic diagram of a constellation 100 of space vehicles 102A-102E, in accordance with some embodiments. Constellation 100 includes space vehicles 102A-102E in several planes at several slots in each plane on planetary body 108. Each space vehicle 102A-102E includes sensors 104A-104E being configured to observe a volume 106A-106E. This provides opportunities for intercalibration when space vehicles 102A-102E occasionally pass nearly over the same place on planetary body 108 while observing the same volume (coinciding collects).

Intercalibration can restore the performance of these systems by taking advantage of these coinciding collects. Space vehicles 102A-102E may send the information for intercalibration to ground station 110 for processing using a computing system.

In some embodiments, space vehicles 102A-102E are satellites positioned in a region in space and above a planetary body. In some embodiments, space vehicles 102A-102E are unmanned aerial vehicles (UAVs) positioned above a planetary body.

Figure 2:
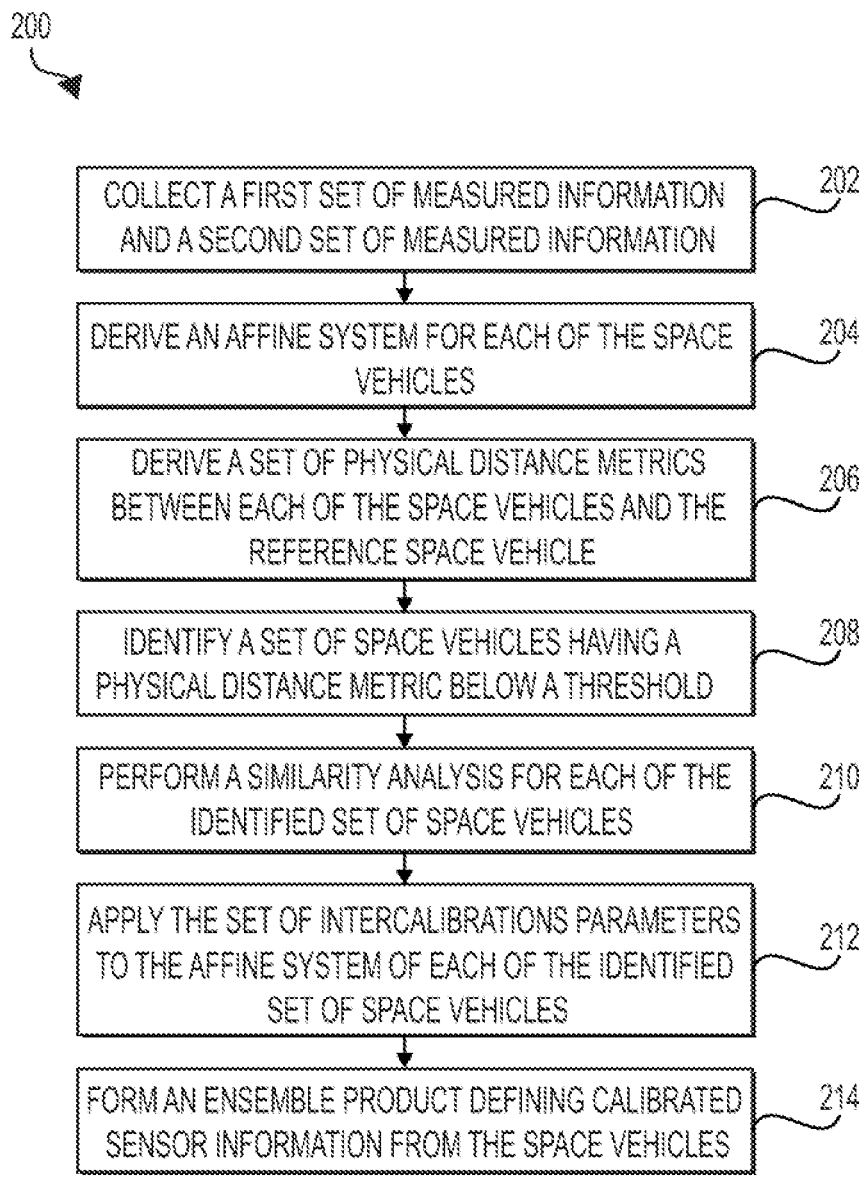
FIG. 2 is a flowgraph of operations included in an example method for intercalibration between remote sensing systems, in accordance with some embodiments.

FIG. 2 is a flowgraph of operations included in an example method 200 for intercalibration between remote sensing systems, in accordance with some embodiments. The operations may be implemented using computer-executable instructions stored on one or more non-transitory machine-readable storage media. The instructions may be executed by one or more processing devices located at ground station 110 as described in FIG. 1, to implement the operations.

Method 200 includes collecting a first set of measured information, sensor information from space vehicles 102B-102E, from a plurality of space vehicles, such as space vehicles 102B-102E, and second set of measured information from a reference space vehicle, such as space vehicle 102A (Step 202). The first set of measured information and the second set of measured information may be received via an RF link. Method 200 includes deriving, using the first set of measured information, an affine system $T_{a,b}(\vec{x}_I)$ for each of the space vehicles (Step 204), where $\vec{x}_I$ is the sensor information for space vehicle i with a and b as variables defining the affine system. The affine system is defined in the form of $T_{a,b}(\vec{x}_i) = A\vec{x}_i + B$, where the A is associated with gains and B is associated with offsets. Note variables a and b are entries of A and B, respectively. A set of physical distance metrics $d(\vec{R}(\vec{x}_i), \vec{R}(\vec{x}_r))$ (in space and time) are derived between each of the space vehicles $\vec{x}_i$ and the reference space vehicle $\vec{x}_r$ (Step 206), where $\vec{R}$ is the position in space and time. The physical distance metric is a metric that becomes large quickly if the distance is great, such as an $l_p$ norm of the difference with $p \geq 2$. A small d means "highly coincident." The physical distance metric may imply a triangle inequality.

Method 200 includes identifying, using the set of physical distance metrics, a set of space vehicles having a physical distance metric below a threshold (Step 208). The selection of the threshold is to provide a minimum starting point defining high coincidence between a space vehicle and a reference space vehicle. Upon identifying the set of space vehicles, deriving a similarity analysis for each of the identified set of space vehicles producing a set of intercalibration parameters for each of the identified set of space vehicles (Step 210). The similarity analysis includes using a similarity measure $$S_i = \frac{\|T_{a,b}(\vec{x}_i) - \vec{x}_r\|_{l_1}}{\|T_{a,b}(\vec{x}_i)\|_{l_2}^{\frac{1}{2}} \|\vec{x}_r\|_{l_2}^{\frac{1}{2}}}$$

that is optimized over the variables a and b (the affine system) using an iterative algorithm, AI, genetic programming, machine learning (ML), or the like to solve the argmin to determine the intercalibration parameters (a*, b*) for each space vehicle $\vec{x}_i$ having a physical distance metric.

Method 200 includes applying the set of intercalibration parameters to the affine system of each of the identified set of space vehicles producing a set of affine information (Step 212). The following below define the set of affine information:

$$T_{a^*_1,b^*_1} \cdots T_{a^*_n,b^*_n} \qquad \text{Eq. 1}$$

where each affine $T_{a^*_n,b^*_n}$ is applied intercalibration parameters $a^*_n$ and $b^*_n$.

Method 200 includes forming, using the set of affine information, an ensemble product defining calibrated sensor information from the space vehicles (Step 214). The ensemble product is defined as follows:

$$\vec{x}_e = \left[\frac{1}{1+d_{1,r}}T_{a_1^*,b_1^*}(\vec{x}_1) + \frac{1}{1+d_{2,r}}T_{a_1^*,b_1^*}(\vec{x}_2) + \ldots + \frac{1}{1+d_{n,r}}T_{a_n^*,b_n^*}(\vec{x}_n)\right] \bigg/ \left(\frac{1}{1+d_{1,r}} + \frac{1}{1+d_{2,r}} + \ldots + \frac{1}{1+d_{n,r}}\right)$$ Eq. 2 where $d_{n,r}$ is the physical distance metric and the special denominator term $$\left(\frac{1}{1+d_{1,r}} + \frac{1}{1+d_{2,r}} + \ldots + \frac{1}{1+d_{n,r}}\right)$$

is utilized to manage relative differences in how strongly coincident the data are and to down-weight data that is not strongly coincident. Eq. 2 is the sum of each term of the set of
affine information $T_{a^*_n,b^*_n}$ scaled by a factor $$\frac{1}{1+d_{n,r}}.$$

This sum is further scaled by the special denominator term $$\left(\frac{1}{1+d_{1,r}} + \frac{1}{1+d_{2,r}} + \ldots + \frac{1}{1+d_{n,r}}\right).$$

In some embodiments, the measure of error for each of the space vehicles is provided along with the ensemble product. In some embodiments, the set of physical distance metrics are provided along with the ensemble product.

Figure 3:
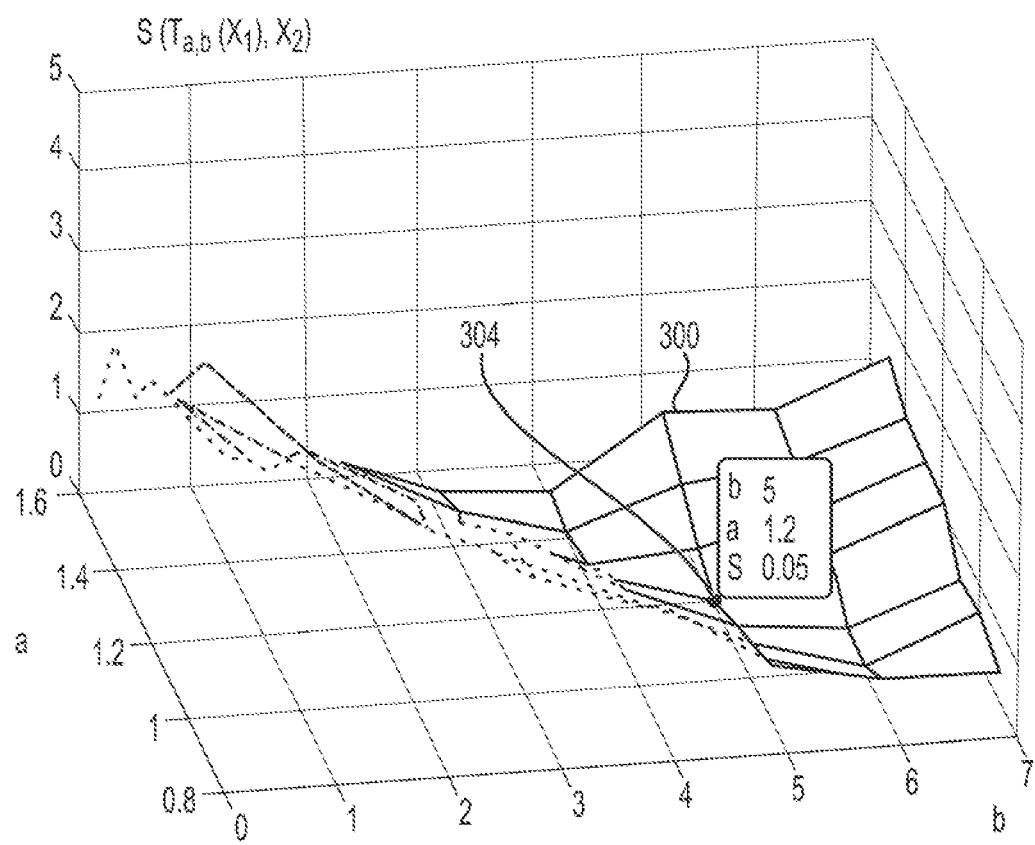
FIG. 3 is a graphical representation of the similarity measure of FIG. 2, in accordance with some embodiments.

FIG. 3 is a graphical representation of the similarity measure $S_i$ of FIG. 2, in accordance with some embodiments. In particular, the similarity measure $S_i$, as shown in plot 300, is defined by three variables, a, b, and $T_{a,b}(\vec{x}_i)$. Each of these variables is labeled with its corresponding axis. Within the affine system of $x_i$, there is a distinct extremum 304 in the similarity measure $S_i(T_{a,b}(\vec{x}_i), x_2)$, where the tuple (a*,b*) optimally intercalibrates space vehicle $x_i$ to space vehicle $x_2$. The extremum 304 is a minimum of the similarity measure $S_i$.

Moreover, the solution of the intercalibration problem then is achieved by applying an argmin over the affine system:

$$\arg\min_{(a,b)} S_i(T_{a,b}(\vec{x1}), x2) = (1.2, 5) = (a^*, b^*)$$ Eq. 3

In this example, i=1 and the distinct extremum occurs when Si=0.05 where a*=1.2 and b*=5. As discussed in FIG. 2, the set of intercalibration parameters includes the argmin over the affine system for each space vehicle $x_i$ having a distance metric below the discussed threshold. In some implementations, the variables a* and b* include a number of values defining entries in matrices A and B of the affine system $T_{a,b}(\vec{x}_i) = A\vec{x}_i + B$ described above.

Figure 4:
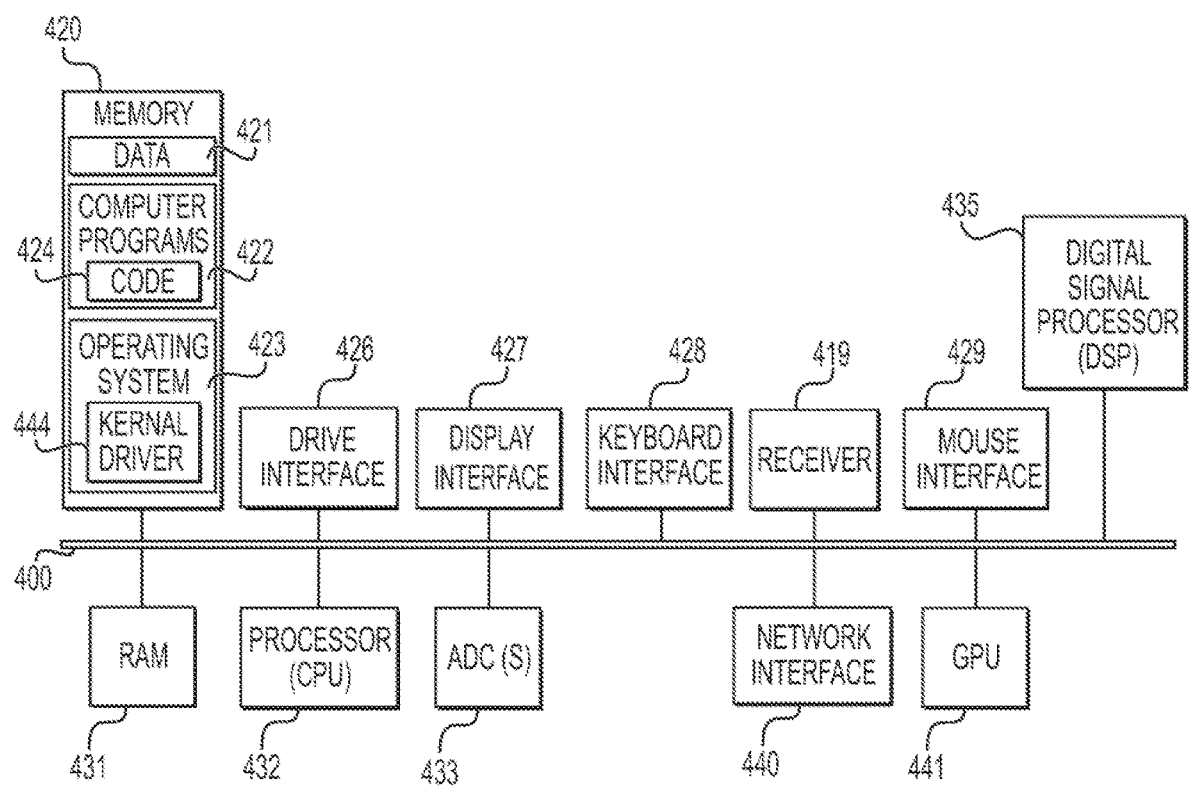
FIG. 4 is a schematic diagram of components that may be included in a computing system located in the ground station of FIG. 1, in accordance with some embodiments.

FIG. 4 is a schematic diagram of components that may be included in a computing system 400 located at ground station 110 of FIG. 1, in accordance with some embodiments. As shown in FIG. 4, computing system 400 includes memory 420, which may include a non-transitory computer-readable medium such as a computer hard disk. Memory 420 stores data 421, computer programs 422, and operating system 423, among other things. Among the computer programs stored in memory 420 is computer code 424 associated with method 200. Also included in computing system 400 are drive interface 426, display interface 427, keyboard interface 428, mouse interface 429, one or more computer buses 430, random access memory (RAM) 431, processor (CPU) 1332, and graphic processing unit (GPU) 1341. The computer system 400 may include a display that works in conjunction with display interface 427, and a keyboard that works in conjunction with keyboard interface 428 for inputting text and user commands. Also, the computer system 400 may include a mouse that works in conjunction with mouse interface 429 for positioning a cursor on display screen and for inputting user commands.

In some embodiments, memory 420 may contain multiple memory components for storing data. In some embodiments, RAM 431 may contain multiple RAMs for processing computer instructions.

Processor 432 may be a microprocessor, programmable logic, or the like for executing computer programs, such those noted above, out of RAM 431. Processor 432 accesses computer programs (or other data) stored on an external device via drive interface 426. GPU 441 is a type of processing device. For example, the GPU 441 may be a programmable logic chip that is configured to implement and to control display functionality. To this end, a GPU 441 may be programmed to render images, animation, and video on the computer's screen. The GPU 441 may be located on a plug-in card or in a chipset on the motherboard of the computing system, or the GPU 441 may be in the same physical chip as the CPU 432. In some implementations, the CPU 432 may contain multiple CPUs. The multiple CPUs may be configured for parallel computing, in some embodiments.

The computer system 400 may have a receiver 419, e.g., a radio receiver, to receive and/or transmit information wirelessly or the like. Computing system 400 may also include one or more analog to digital converters (ADC) 433 to convert incoming analog RF signals from receiver 419 to digital samples. The computing system 400 may also include a digital signal processor (DSP) 435 to perform digital signal processing operations on the digital samples. The DSP 435 may also be operated to improve the quality of the digital samples. The DSP may also be capable of executing computer programs that do not relate to signal processing.

Computing system 400 includes a network interface 440, such as an Ethernet port, for interfacing to a network, such as the Internet. In some embodiments, computing system 400 may be a server connected to multiple computing systems 400.

In some implementations, multiple electronic components, such as the GPU 441, the CPU 432, and/or the DSP 435, may execute one or more computer programs concurrently or contemporaneously. In some implementations, the GPU 441 may contain multiple components of each type shown in FIG. 4; for example, multiple CPUs, multiple GPUs, multiple DSPs, and so forth. One or more of each type of component may be configured to execute one or more computer programs concurrently, contemporaneously, or simultaneously.

The disclosure describes a system and method for intercalibration between affine-invariant space vehicles. The advantages provided by the system and method for intercalibration between affine-invariant space vehicles include combining data between the two coincident or nearly coincident sensors using an affine-invariant similarity measure. A special denominator is used to manage relative differences in how strongly coincident the data are and to down-weight data that is not strongly coincident. Also, the system and method for intercalibration between affine-invariant space vehicles include producing several metadata items that are useful for validation and confidence levels and calibration of sensors. The system and method for intercalibration between affine-invariant space vehicles utilize several innovative metrics and norms to measure similarity and distance. An ensemble measurement data vector is derived, which is an optimal measurement of data provided by the space vehicles.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A system comprising:
    one or more computing device processors; and
    one or more computing device memories, coupled to the one or more computing device processors, the one or more computing device memories storing instructions executed by the one or more computing device processors, wherein the instructions are configured to:
    collect a first set of measured information from a plurality of space vehicles and a second set of measured information from a reference space vehicle;
    derive, using the first set of measured information, an affine system for each of the space vehicles;
    derive, using the first set of measured information and the second set of measured information, a set of physical distance metrics between each of the space vehicles and the reference space vehicle;
    identify, using the set of physical distance metrics, a set of space vehicles having a physical distance metric below a threshold;
    upon identifying the set of space vehicles, perform a similarity analysis for each of the identifier set of space vehicles producing a set of intercalibration parameters for each of the identified set of space vehicles;
    apply the set of intercalibration parameters to the affine system of each of the identified set of space vehicles producing a set of affine information; and
    form, using the set of affine information, an ensemble product defining calibrated sensor information from the space vehicles.

2. The system of claim 1, wherein while collecting the first set of measured information from and the second set of measured information, the instructions are configured to receive the first set of measured information and the second set of measured information via an RF link.

3. The system of claim 1, wherein the space vehicles are a constellation of space vehicles.

4. The system of claim 1, wherein each of the set of physical distance metrics comprises a physical distance metric that rises substantially when the distance between a particular space vehicle and the reference space vehicle rises.

5. The system of claim 1, wherein while identifying the set of space vehicles, the instructions are configured to select a threshold defining coincidence between a particular space vehicle and the reference space vehicle.

6. The system of claim 1, wherein while performing the similarity analysis, the instructions are configured to derive a similarity measure to be used by the simulation analysis.

7. The system of claim 6, wherein while performing the similarity analysis, the instructions are configured to optimize the similarity measure to determine the set of intercalibration parameters.

8. The system of claim 1, wherein while forming the ensemble product, the instructions are configured to sum each of the set of affine information.

9. The system of claim 1, wherein the ensemble product comprises a factor to manage relative differences in how strongly coincident data in the ensemble are and to down-weight data that is not strongly coincident.

10. A method for intercalibration between remote sensing systems, the method comprising:
    collecting a first set of measured information from a plurality of space vehicles and a second set of measured information from a reference space vehicle;
    deriving, using the first set of measured information, an affine system for each of the space vehicles;
    deriving, using the first set of measured information and the second set of measured information, a set of physical distance metrics between each of the space vehicles and the reference space vehicle;
    identifying, using the set of physical distance metrics, a set of space vehicles having a physical distance metric below a threshold;
    upon identifying the set of space vehicles, performing a similarity analysis for each of the identified set of space vehicles producing a set of intercalibration parameters for each of the identified set of space vehicles;
    applying the set of intercalibration parameters to the affine system of each of the identified set of space vehicles producing a set of affine information; and
    forming, using the set of affine information, an ensemble product defining calibrated sensor information from the space vehicles.

11. The method of claim 10, wherein collecting the first set of measured information from and the second set of measured information comprises receiving the first set of measured information and the second set of measured information via an RF link.

12. The method of claim 10, wherein the space vehicles are a constellation of space vehicles.

13. The method of claim 10, wherein each of the set of physical distance metrics comprises a physical distance metric that rises substantially when the distance between a particular space vehicle and the reference space vehicle rises.

14. The method of claim 10, wherein identifying the set of space vehicles comprises selecting a threshold defining a level of coincidence between a particular space vehicle and the reference space vehicle.

15. The method of claim 10, wherein performing the similarity analysis comprises deriving a similarity measure to be used by the simulation analysis.

16. The method of claim 15, wherein performing the similarity analysis comprises optimizing the similarity measure to determine the set of intercalibration parameters.

17. The method of claim 10, wherein forming the ensemble product comprises summing each of the set of affine information.

18. The method of claim 10, wherein the ensemble product comprises a factor to manage relative differences in how strongly coincident data in the ensemble are and to down-weight data that is not strongly coincident.

19. A non-transitory computer-readable storage medium storing instructions which when executed by a computer cause the computer to perform a method for intercalibration between remote sensing systems, the method comprising:

collecting a first set of measured information from a plurality of space vehicles and a second set of measured information from a reference space vehicle;

deriving, using the first set of measured information, an affine system for each of the space vehicles;

deriving, using the first set of measured information and the second set of measured information, a set of physical distance metrics between each of the space vehicles and the reference space vehicle;

identifying, using the set of physical distance metrics, a set of space vehicles having a physical distance metric below a threshold;

upon identifying the set of space vehicles, performing a similarity analysis for each of the identified set of space vehicles producing a set of intercalibration parameters for each of the identified set of space vehicles;

applying the set of intercalibration parameters to the affine system of each of the identified set of space vehicles producing a set of affine information; and forming, using the set of affine information, an ensemble product defining calibrated sensor information from the space vehicles.

20. The non-transitory computer-readable storage medium of claim 19, wherein the ensemble product comprises a factor to manage relative differences in how strongly coincident data in the ensemble are and to down-weight data that is not strongly coincident.

* * * * *